(12) United States Patent
Kikuchi

(10) Patent No.: US 7,748,679 B2
(45) Date of Patent: Jul. 6, 2010

(54) CONTAINER SECURING DEVICE

(75) Inventor: Masami Kikuchi, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 0 days.

(21) Appl. No.: 12/216,225

(22) Filed: Jul. 1, 2008

(65) Prior Publication Data
US 2009/0045309 A1 Feb. 19, 2009

(30) Foreign Application Priority Data
Jul. 2, 2007 (JP) ............... 2007-173903

(51) Int. Cl.
*A47K 1/08* (2006.01)
(52) U.S. Cl. ............... 248/311.2; 248/314; 248/316.2; 224/926
(58) Field of Classification Search ............. 248/311.2, 248/314, 316.1, 316.2, 313; 220/737; 224/926
See application file for complete search history.

(56) References Cited
U.S. PATENT DOCUMENTS

| | | | |
|---|---|---|---|
| 5,782,448 A | * | 7/1998 | Withun et al. ............ 248/311.2 |
| 5,839,711 A | * | 11/1998 | Bieck et al. ................. 248/313 |
| 6,705,580 B1 | * | 3/2004 | Bain ....................... 248/311.2 |
| 6,749,167 B2 | * | 6/2004 | Kaupp et al. ............. 248/311.2 |
| 6,860,457 B2 | * | 3/2005 | Then et al. ............... 248/311.2 |
| 7,380,762 B2 | * | 6/2008 | Takeichi .................. 248/311.2 |
| 2003/0155477 A1 | | 8/2003 | Schaal |
| 2004/0118860 A1 | * | 6/2004 | Leopold et al. ............ 220/737 |

FOREIGN PATENT DOCUMENTS
JP 2003-237452 8/2003

* cited by examiner

*Primary Examiner*—Anita M King
(74) *Attorney, Agent, or Firm*—Wenderoth, Lind & Ponack, L.L.P.

(57) ABSTRACT

A container securing device includes a housing portion, with a cylindrical shape, the top of which is open, and which is intended to house a beverage container. A flap is positioned within a hole that is formed within a surrounding wall of the housing portion, and is installed so as to be capable of moving either out of the housing portion, or into the housing portion, in response to the container being inserted into, or extracted from, the housing portion. An impelling (biasing) component forces the flap toward the interior direction of the housing unit. The flap is capable of moving to a location that secures the container when the container is fully housed within the housing portion.

6 Claims, 11 Drawing Sheets

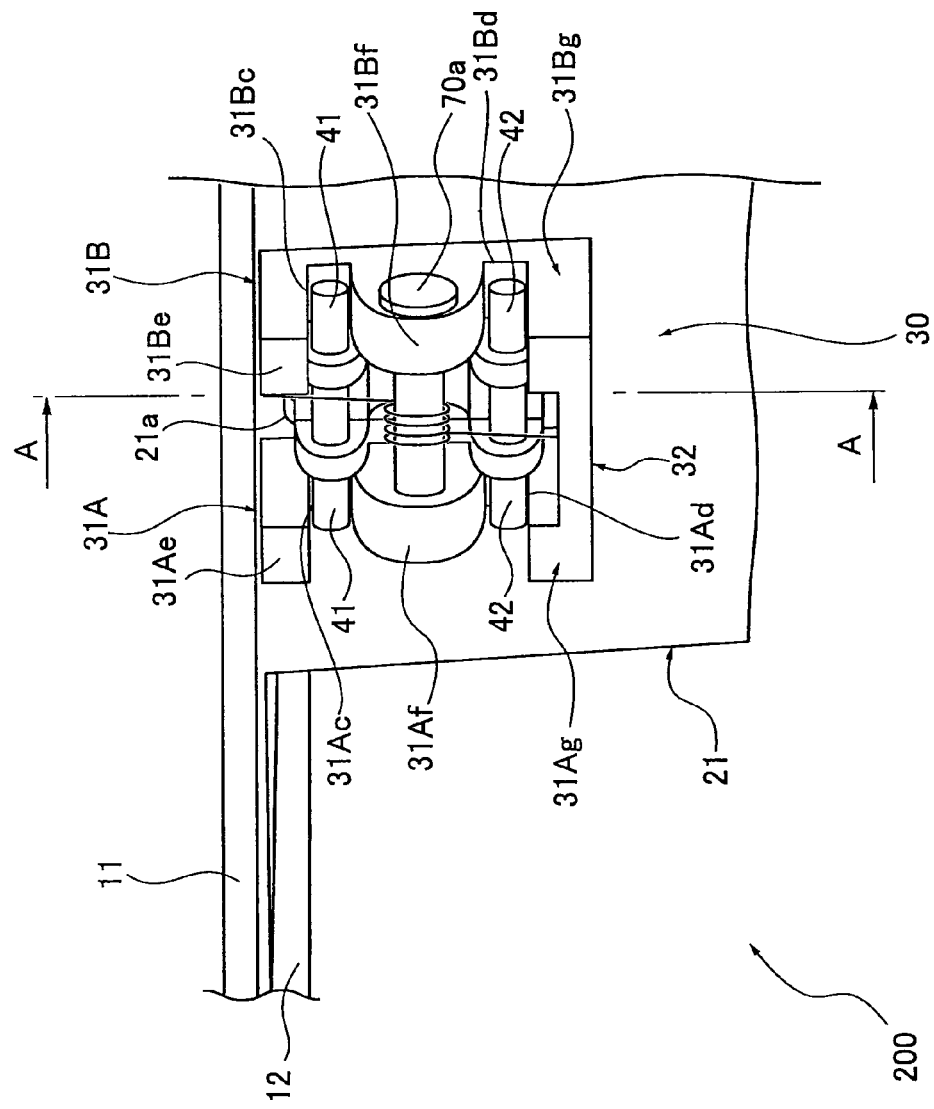

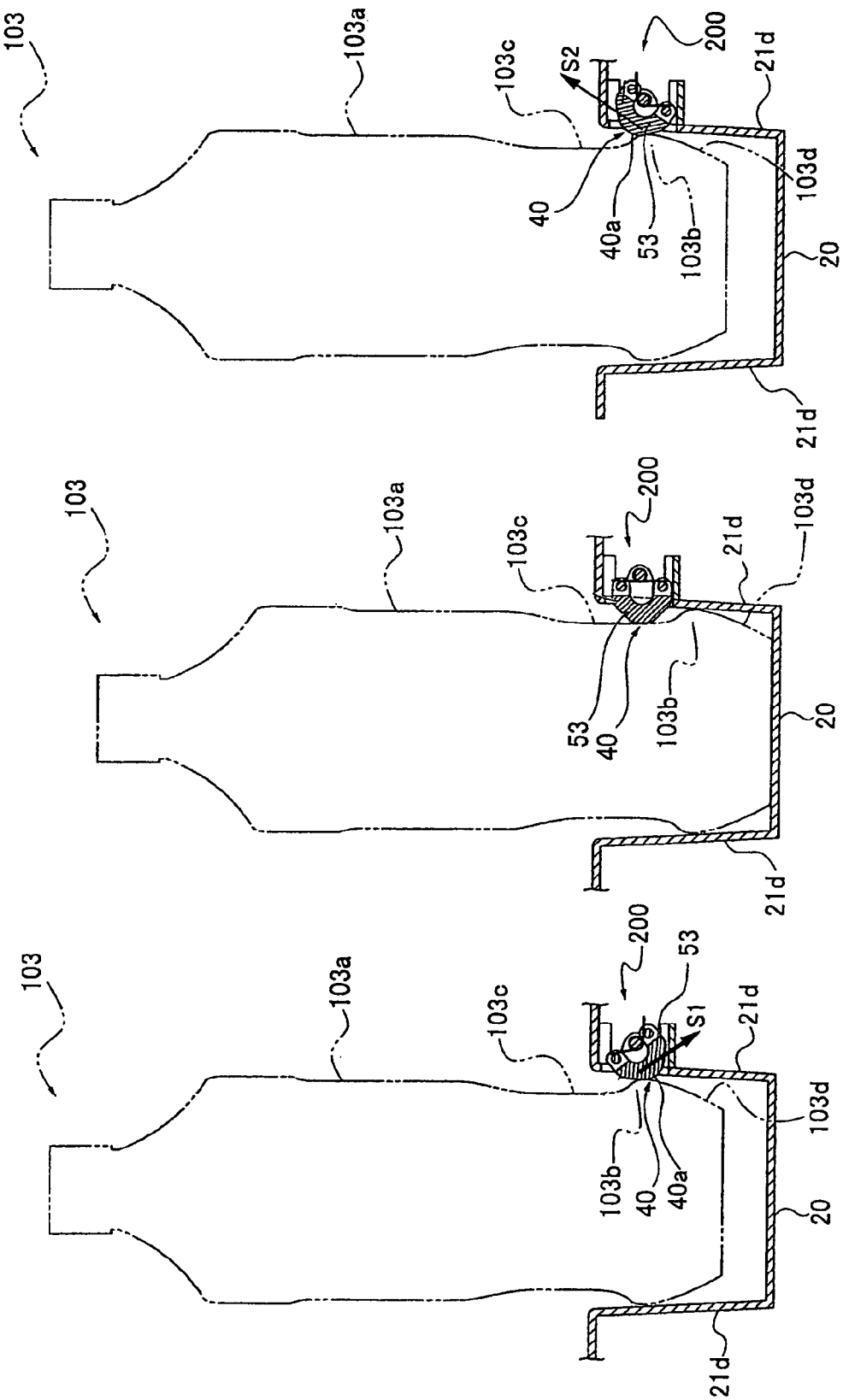

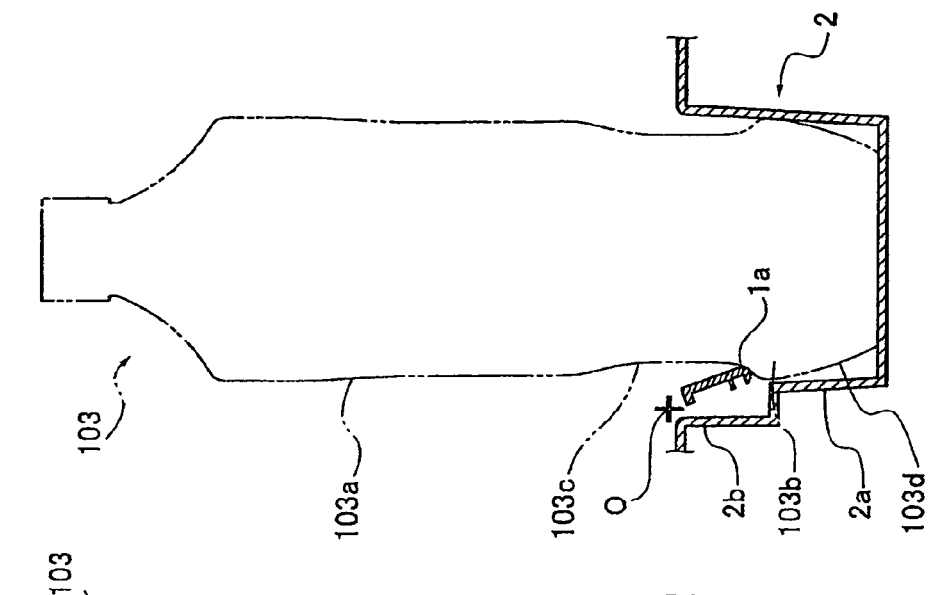
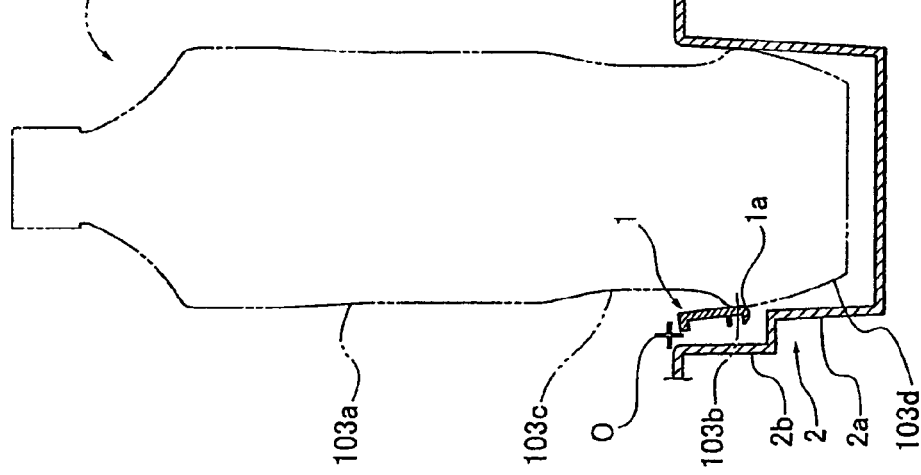
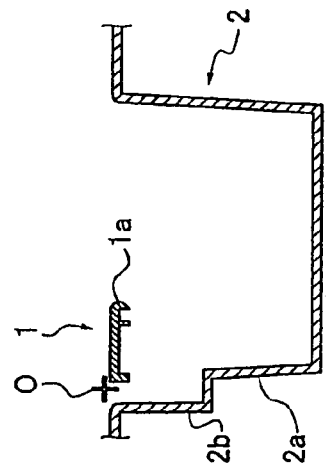

CONTAINER SECURING DEVICE

CROSS-REFERENCE TO THE RELATED APPLICATION

This application is based on and claims the priority benefit of Japanese Patent Application No. 2007-173903, filed on Jul. 2, 2007, the disclosure of which is incorporated herein by reference in its entirety.

BACKGROUND OF THE INVENTION

1. Field of the Invention

The present invention relates to a container securing device, including a housing portion with a cylindrical shape, an upper end of which is opened to house a container, such as a beverage container, and a flap, positioned so as to be moveable within a hole that is formed in a cylindrical wall of the housing portion, which secures the beverage container within the housing portion.

2. Description of the Related Art

A container securing device is conventionally known, such as is depicted in FIG. 8A, which includes a housing portion 2, wherein a beverage container 103 is inserted, and a diameter compensation element, i.e., a flap, 1, which is capable of a hinged swinging movement, either forward or backward, in a depression portion 2b of a surrounding wall 2a of the housing portion 2, and which secures the beverage container 103 in the housing portion 2 by causing a leading end portion 1a of the diameter compensation element 1 to protrude into the housing portion 2, a spring (not shown) that impels the diameter compensation element 1 to swing in a counterclockwise direction, and a ratchet mechanism (not shown) that allows the hinged swinging movement in a clockwise direction of the diameter compensation element 1, and checks the hinged swinging movement in the counterclockwise direction thereof, at each of a plurality of prescribed angles, for instance, at 20 degrees, 40 degrees, and 60 degrees; refer, for instance, to Japanese Patent Application Laid-Open No. 2003-237452 for particulars.

As an instance with respect to the conventional container securing device, such as is depicted in FIG. 8B, inserting the beverage container 103, which has a tapering constriction therein, into the housing portion 2 by way of an opening at an upper end thereof, a lower portion 103d of the beverage container 103 comes into contact with the leading end portion 1a of the diameter compensation element 1, resisting an impelling force of the spring element (not shown), and thereby causing the diameter compensation element 1 to swing in the clockwise direction. Furthermore, when the beverage container 103 is inserted thereinto, the diameter compensation element 1 is impelled by the spring, such that a tapering constriction component 103c of the beverage container 103 is impressed upon the leading end portion 1a of the diameter compensation element 1, with a result that the beverage container 103 is secured within the housing portion 2, such as is depicted in FIG. 8C.

When extracting the beverage container 103 from the housing portion 2, however, when the beverage container 103 is in a state such as is depicted in FIG. 8C, the diameter compensation element 1 catches upon a widening component 103b of the beverage container 103, making it difficult to extract the beverage container 103 from the housing portion 2 as a consequence thereof. In addition, due to the ratchet mechanism, the diameter compensation element 1 does not swing in a left hand direction, i.e., in the counterclockwise direction, beyond the prescribed angle. Therefore, forcibly extracting the beverage container 103 from the housing portion 2 may result in a breakage of the diameter compensation element 1 or the ratchet mechanism due to the leading end portion 1a of the diameter compensation element 1 catching upon the widening component 103b of the beverage container 103.

SUMMARY OF THE INVENTION

An object of the present invention is to provide a container securing device that is capable of a) reliably securing even a container with a tapering constriction component thereof and b) allowing the container to be easily extracted, without being caught upon a widening component thereof.

In order to accomplish the above object, a container securing device according to an embodiment of the present invention includes a housing portion with a cylindrical shape, an upper end of which is opened to house a container, and a flap positioned within a hole that is formed in a cylindrical wall of the housing portion so as to be capable of moving either into, or out of, the housing portion in response to an insertion of the container into the housing portion, or an extraction of the container from the housing portion.

When the container is fully housed within the housing portion, the flap is capable of moving to a location that secures the container therein.

BRIEF DESCRIPTION OF THE DRAWINGS

FIG. 4B depicts a key portion of the container securing device that is depicted in either FIG. 2A or FIG. 2B.

FIGS. 7A to 7C are cutaway views that describe an operation of the container securing device according to the embodiment.

FIGS. 8A to 8C are cutaway views that describe an operation of a conventional container securing device.

DETAILED DESCRIPTION OF THE PREFERRED EMBODIMENTS

Preferred embodiments of the present invention will be explained in detail hereinafter, with reference to the accompanying drawings.

Figure 1:
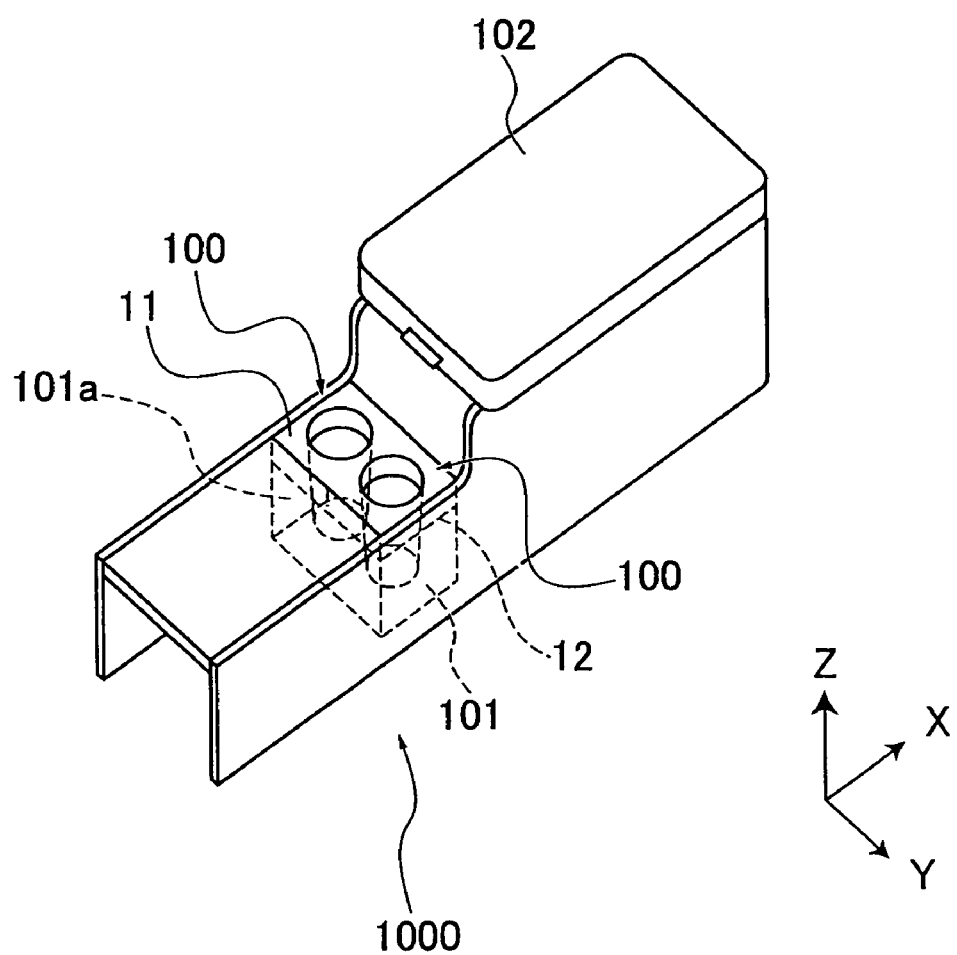
FIG. 1 is an oblique view that depicts a center console within an automobile to which is applied a container securing device according to an embodiment of the present invention.

FIG. 1 depicts a container securing device according to the present invention; as an example, according to an embodiment wherein a container securing device according to the present invention is applied to an automobile.

According to the embodiment, a center console 1000, of an approximately rectangular shape, and which is positioned in an interior of the automobile (not shown), such as is depicted in FIG. 1, comprises a compartment 101, which is a rectangular box that is formed within an approximate center portion of the center console 1000, and an armrest 102, which is installed in a portion of the center console 1000 to a rear of the compartment 101, at a different elevation therefrom, and which opens and closes on a support of an axle (not shown).

A pair of container securing devices 100, 100 according to the present invention is fitted into an upper opening of the compartment 101.

Figure 2A:
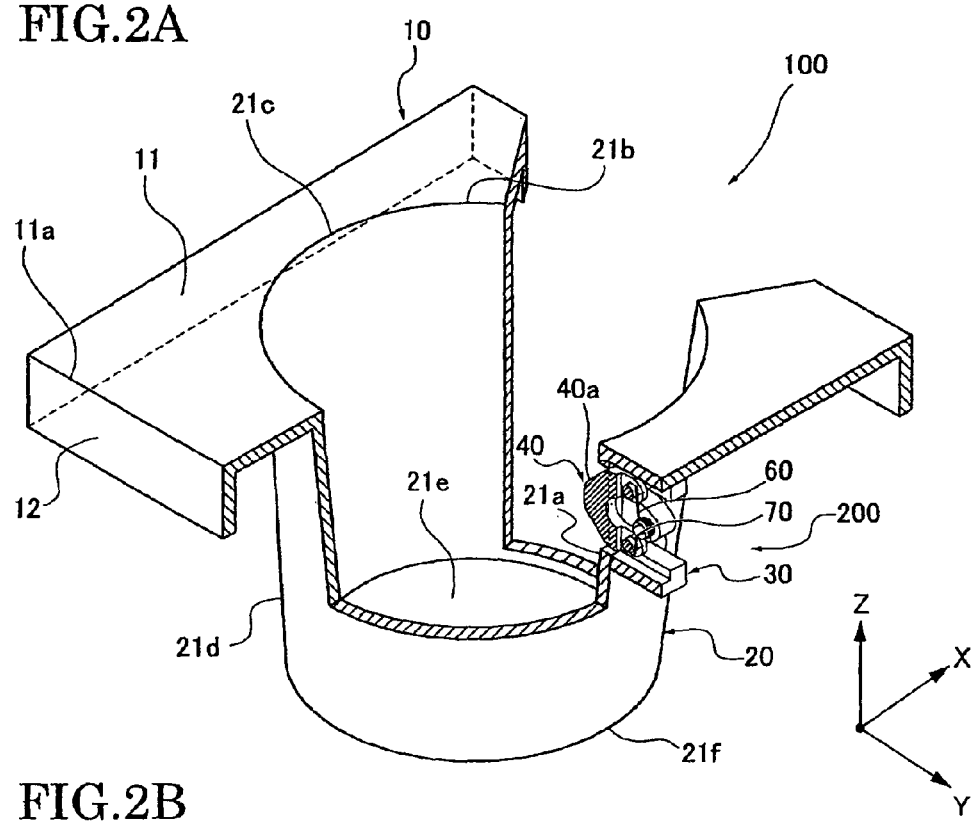
FIG. 2A is a partial cutaway oblique view of the container securing device that is depicted in FIG. 1.

Each respective container securing device 100 comprises, as an example, a housing portion 20, which is shaped as a cylindrical body, and which is open at an upper end thereof, in order to house a container, as an example, a beverage container 103 (refer to FIGS. 7A to 7C), a panel portion 10 that is installed in an upper portion of the housing portion 20, and a securing mechanism 200 that is installed in an outer portion of an exterior cylindrical wall 21d of the housing Portion 20, such as is depicted in FIG. 2.

It would be permissible for each respective component that configures the container securing device 100 to be formed of essentially any material that does not deform as a result of an effect of a heat that would be transmitted thereto from the beverage container 103. It would be desirable to use a material that does not suffer heat shrinkage.

The panel portion 10 comprises the two housing portions 20, 20, a flange 11 (partially not shown) that is formed as a single unit with the upper end of the two housing portions 20, 20 (only one thereof shown), and a rib 12, which extends in a downward direction from four edge portions 11a of the flange 11.

The flange 11 is formed in a shape that is nearly identical to the shape of the upper opening of the compartment 101 of the center console 1000, such as is depicted in FIG. 1. Fitting the container securing devices 100, 100 into the compartment 101 brings the rib 12 of the flange 11 into contact with an interior wall 101a (refer to FIG. 1) of the compartment 101.

Figure 2B:
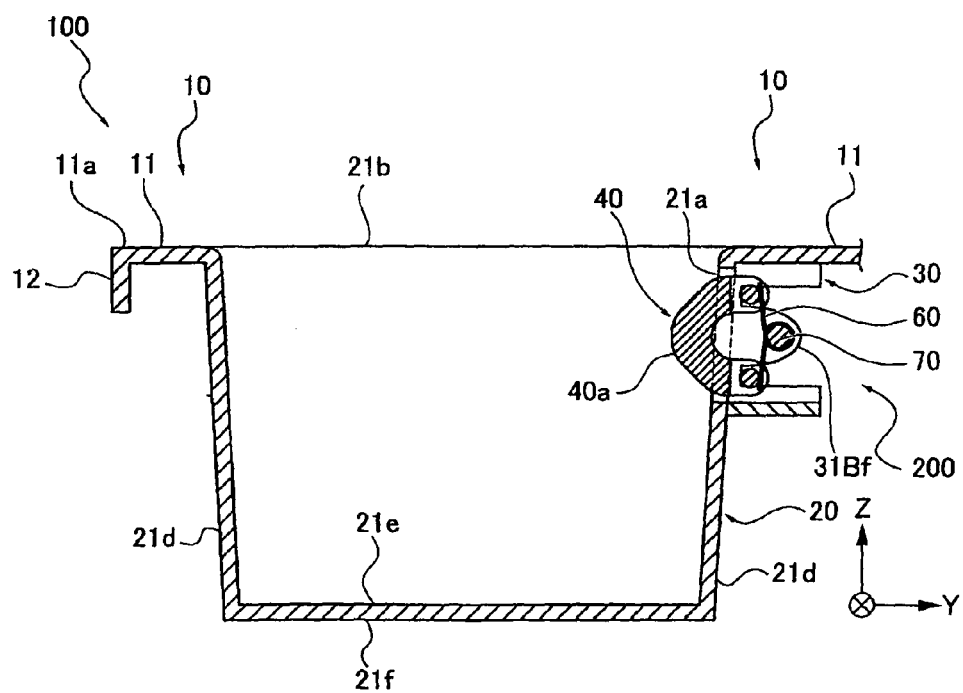
FIG. 2B is a cutaway view of the container securing device that is depicted in FIG. 1.
Figure 3:
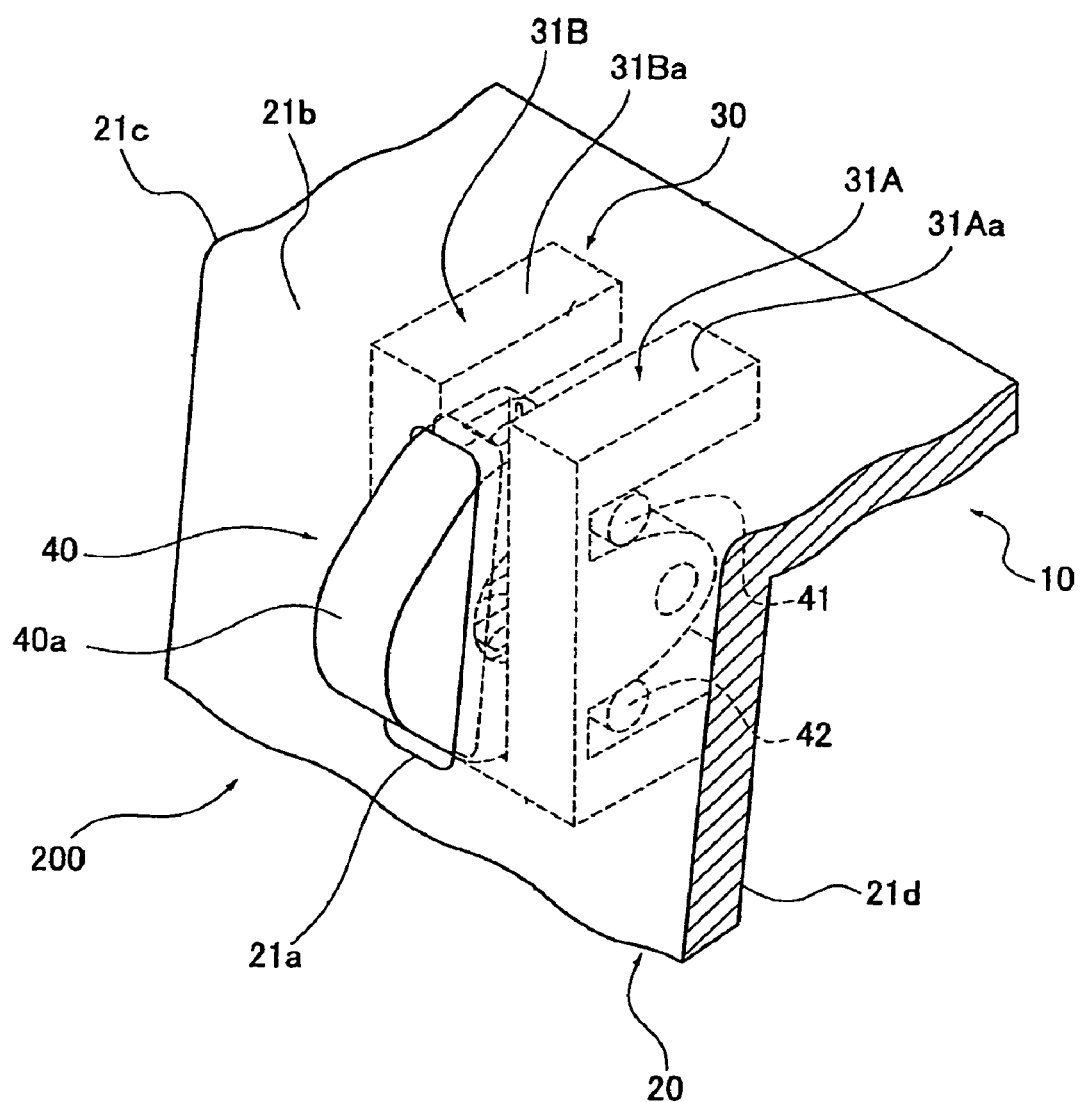
FIG. 3 is an oblique view that depicts a key portion of the container securing device that is depicted in either FIG. 2A or FIG. 2B.

A hole 21a is formed in each respective housing portion 20, in an immediate vicinity of an upper opening 21b thereof, and which protrudes into in the cylindrical external wall 21d thereof, such as is depicted in FIG. 2 and FIG. 3.

With respect to an interior surface of the housing portion 20, an inner diameter thereof inclines gradually from an upper opening end 21c of the housing portion 20, narrowing toward a base wall 21e thereof, such as is depicted in FIG. 2B. An under surface 21f of the base wall 21e of each respective housing portion 20 comes into contact with a base wall of the compartment 101, and the container securing device 100 is supported within the compartment 101 (not shown).

The securing mechanism 200 comprises a guide portion 30, which extends outwardly from the cylindrical wall 21d toward an exterior thereof, in a radial direction, a flap 40, which is placed within the guide portion 30 so as to be movable, i.e., in a left to right direction in FIG. 2B, a pin 70, which is placed in a center shoe portion 31Af, 31Bf, (see FIG. 4A) of the guide portion 30, and an impelling (urging) component 60, which impels (urges) the flap 40 into an interior portion of the housing portion 20. The impelling component thereof is formed from a coiled spring, as an example thereof.

Figure 4A:
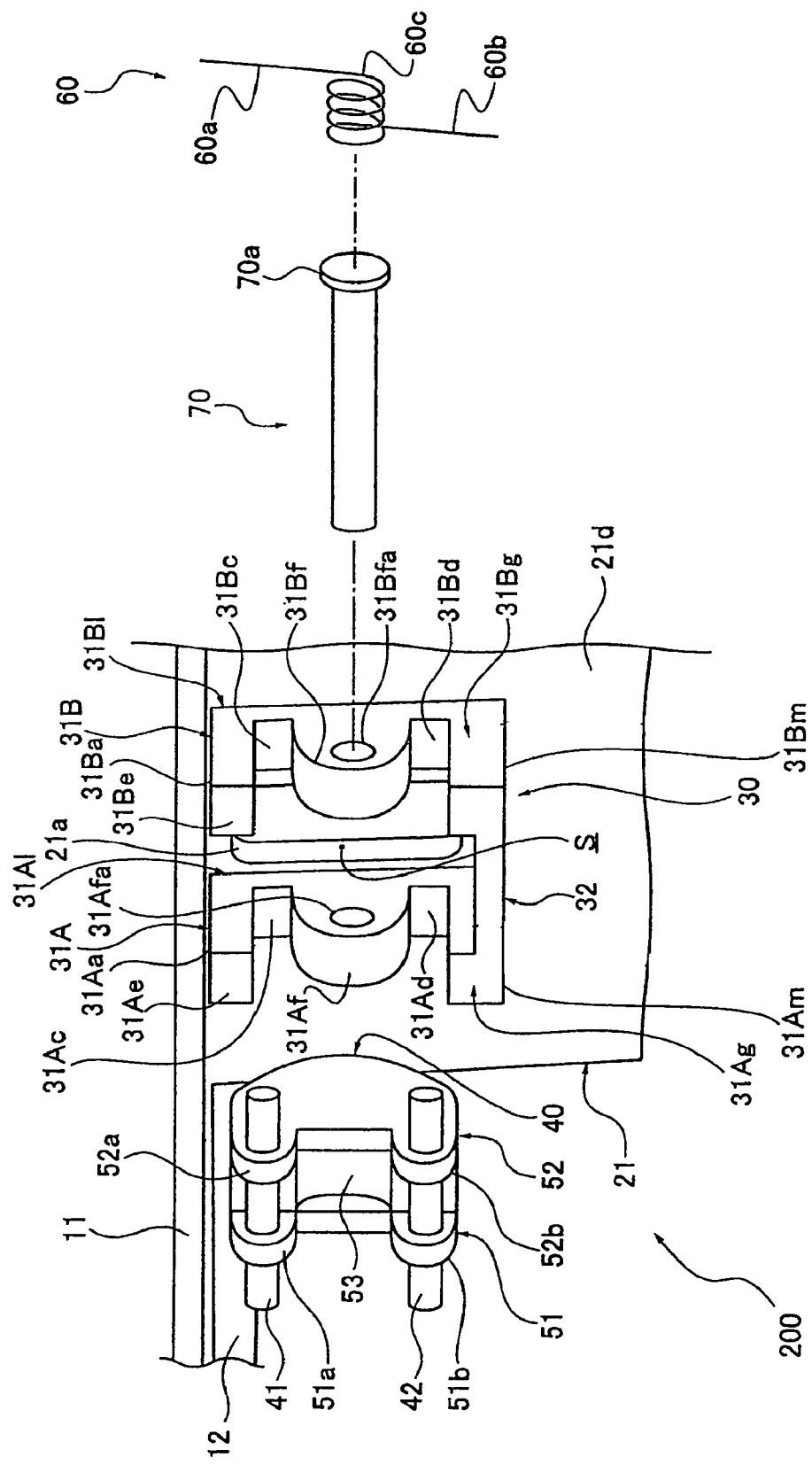
FIG. 4A is an exploded view of the key portion of the container securing device that is depicted in either FIG. 2A or FIG. 2B.

The guide portion 30 comprises a pair of side panels 31A, 31B, which are formed in an approximate "E" shape, with a relative mutual facing thereof, and a substrate 32, which mutually links the side panels 31A, 31B, via a lower portion thereof, such as is depicted in FIG. 4A and FIG. 4B. Each respective side panel 31A, 31B comprises an upper shoe portion 31Ae, 31Be, the center shoe portion 31Af, 31Bf, which is formed in an approximately semicircular arc shape, a lower shoe portion 31Ag, 31Bg, and a linking portion 31Al, 31Bl, which links the respective shoe portions thereof. A crevice 31Ac, 31Ad, 31Bc, 31Bd is respectively formed between each respective upper shoe portion and each respective central shoe portion, and between each respective central shoe portion and each respective lower shoe portion. In addition, the side panels 31A, 31B connect to the exterior surface of the cylindrical wall 21d, in a location that constricts the hole 21a of the cylindrical wall 21d.

A separation distance between the side panels 31A, 31B is set so as to be approximately identical with a width dimension of the hole 21a. In addition, an upper surface 31Aa, 31Ba, of the side panels 31A, 31B is in a location that is higher than an upper edge of the hole 21a, and a lower surface 31Am, 31Bm, of the side panels 31A, 31B is in a location that is lower than a lower edge of the hole 21a.

In addition, the width dimension of the hole 21a is set so as to be approximately identical with a width dimension of the flap 40, and a height dimension of the hole 21a is set so as to be larger than the width dimension of the flap 40.

An axle hole 31Afa, 31Bfa is formed within each respective center shoe portion 31Af, 31Bf, such as is depicted in FIG. 4A, and the pin 70 passes through the axle holes 31Afa, 31Bfa, as is depicted in FIG. 4B. In addition, a height dimension of the crevices 31Ac, 31Bc, and of the crevices 31Ad, 31Bd, is respectively set to be a degree larger than a diameter of a first axle 41 and a second axle 42 of the flap 40 (to be described hereinafter).

Figure 9:
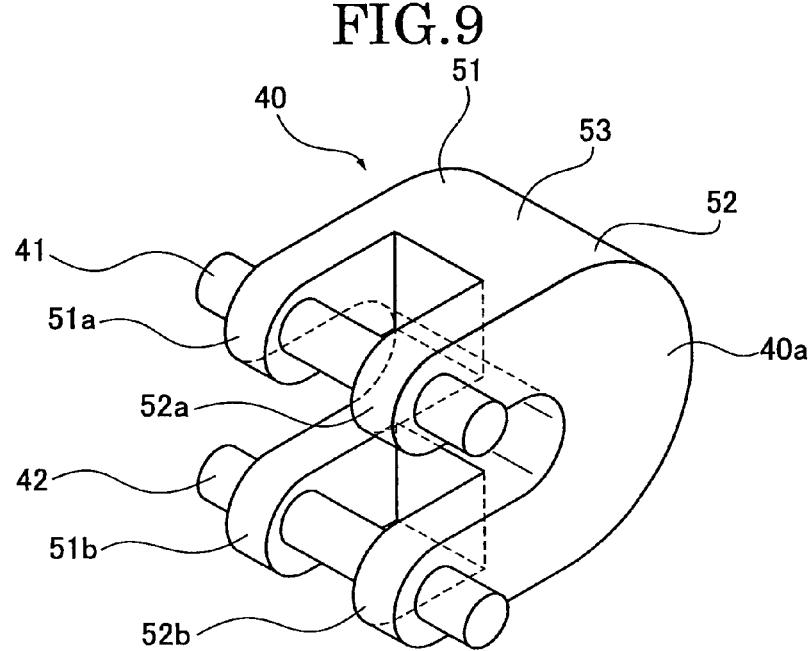
FIG. 9 is a cutaway view that depicts a flap of the container securing device that is depicted in FIG. 4.
Figure 10:
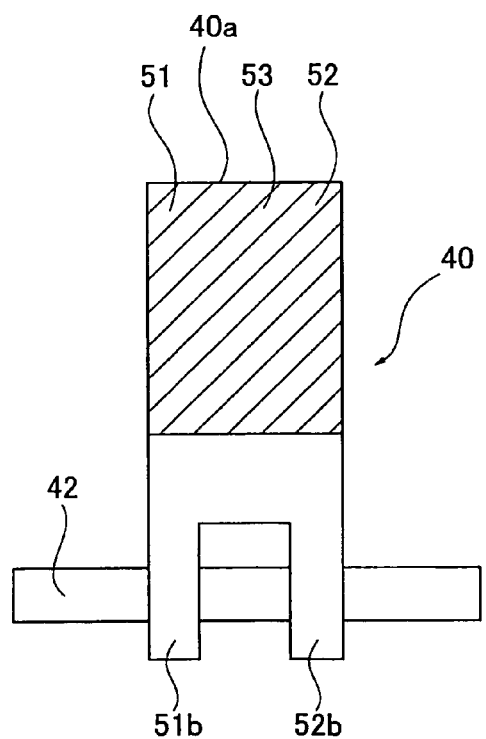
FIG. 10 is a cutaway view of the flap of the container securing device that is depicted in FIG. 4A.
Figure 11:
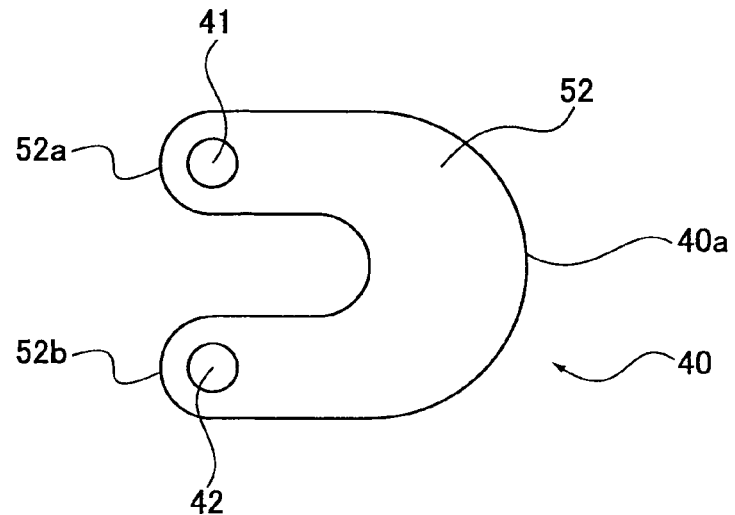
FIG. 11 is an elevation view of the flap of the container securing device that is depicted in FIG. 4A.

The flap 40 comprises a pair of panels 51, 52, which are mutually spaced apart, and which exhibit a "C" shape when viewed from the side, the first axle 41 and the second axle 42, which penetrate an upper protrusion portion 51a, 52a, and a lower protrusion portion 51b, 52b, of the panels 51, 52, and a linking portion 53, which links a leading end portion of the panel 51 and a leading end portion of the panel 52, as is depicted in FIG. 9 through FIG. 11. A circular arc portion of a right hand side of the flap 40 constitutes a leading end 40a, as depicted in FIG. 11.

Figure 12:
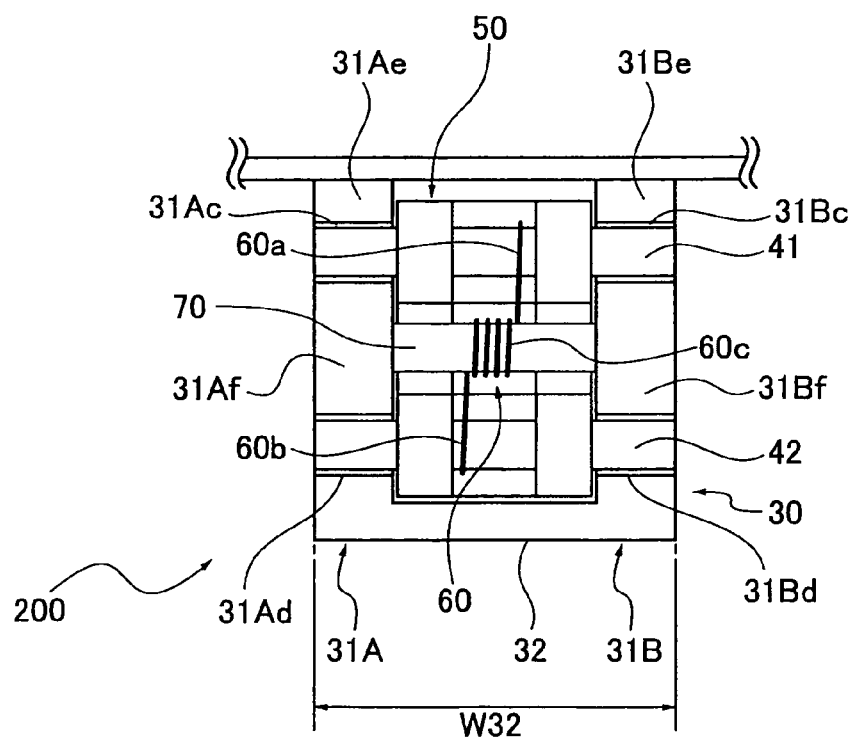
FIG. 12 is a rear view of the key portion of the container securing device that is depicted in FIG. 4B.

A length of the first axle 41 and the second axle 42 is set to be approximately identical to a width W32 of the guide portion 30 (refer to FIG. 12).

In addition, the flap 40 enters into a space between the hole 21a of the housing portion 20, and the side panels 31A, 31B of the guide portion 30, and the leading end 40a of the flap 40 protrudes into the interior portion of the housing portion 20, such as is depicted in FIG. 3.

The first axle 41 enters into the crevices 31Ac, 31Bc of the guide portion 30, is capable of movement in line with the crevices 31Ac, 31Bc thereof, and is supported by an upper surface of the center shoe portion 31Af, 31Bf, such as is depicted in FIG. 4B. In addition, the second axle 42 also enters into the crevices 31Ad, 31Bd of the guide portion 30, is capable of movement in line with the crevices 31Ad, 31Bd thereof and is supported by an upper surface of the lower shoe portion 31Ag, 31Bg, in a manner similar to that of the first axle 41. It is thus possible for the flap 40 to swing in a hinged manner, around the first axle 41 or the second axle 42.

In addition, the flap 40 is guided in a forward and reverse direction with respect to the housing portion 20 by the side panels 31A, 31B of the guide portion 30, as is depicted in FIG. 3, and the leading end 40a of the flap 40 protrudes into the interior portion of the housing portion 20, wherein the leading end 40a thereof makes contact with a side surface 103 of the beverage container 103, as is depicted in FIGS. 7A to 7C.

Figure 5A:
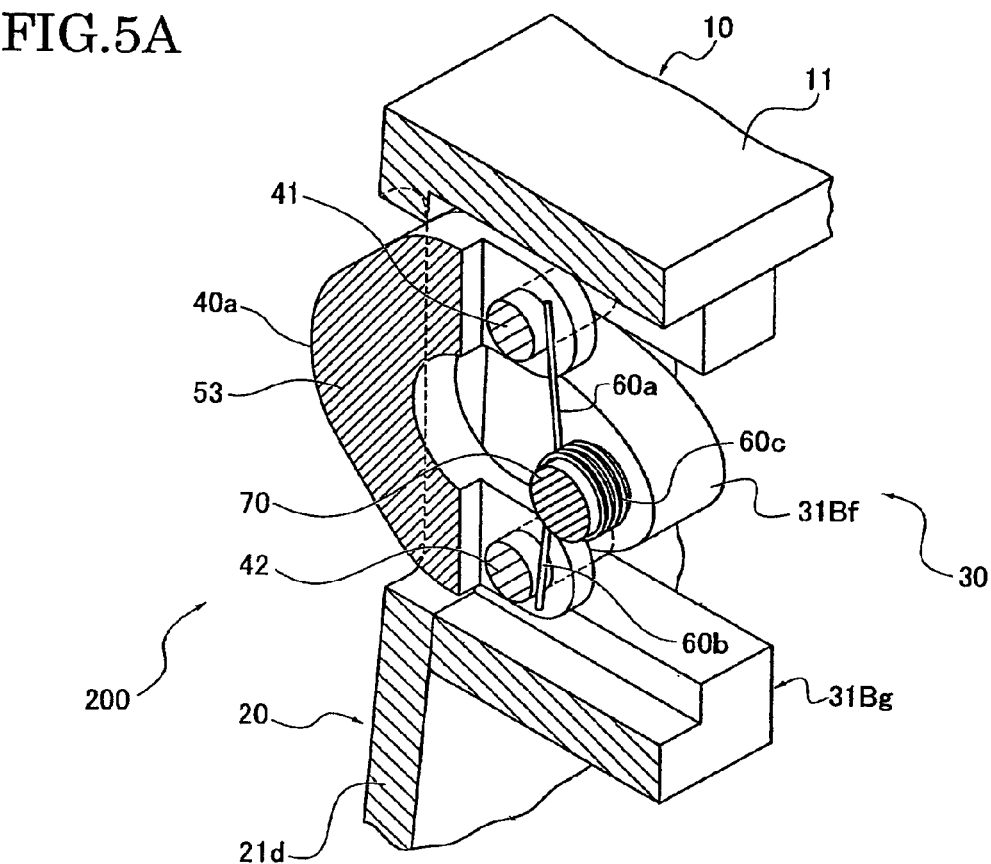
FIG. 5A is an oblique cutaway view that depicts a cutaway of the key portion of the container securing device that is depicted in either FIG. 2A or FIG. 2B and that is obtained along a line A-A that is denoted in FIG. 4B.
Figure 5B:
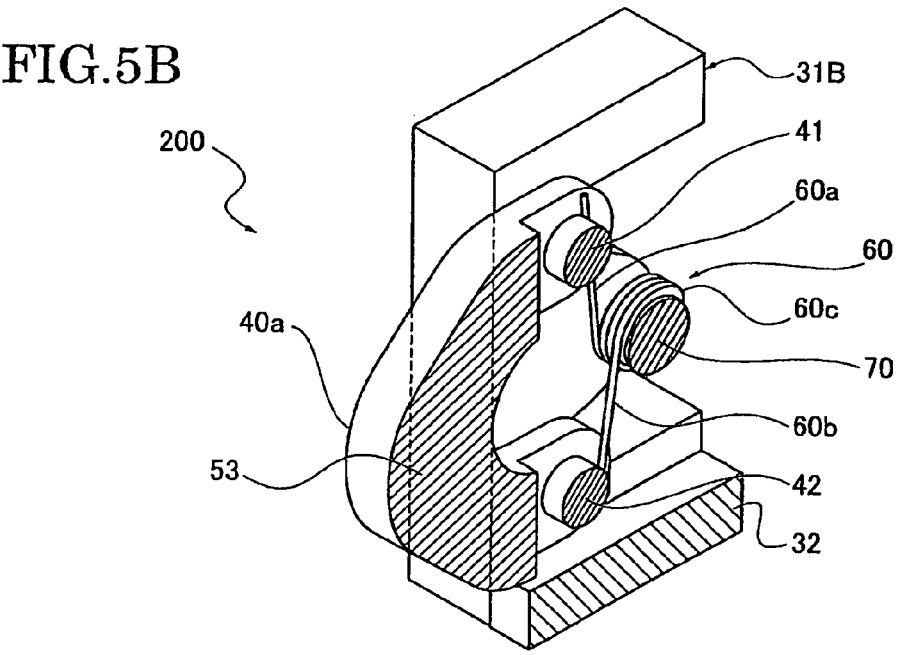
FIG. 5B is an oblique cutaway view that depicts a cutaway of the key portion of the container securing device that is depicted in either FIG. 2A or FIG. 2B and that is obtained along a line A-A that is denoted in FIG. 4B.

The coiled spring 60 is configured from a pair of arm portions in a straight line shape 60a, 60b, and a main spring body in a spiral shape 60c. The coiled spring main body 60c is attached to the pin 70, and the pair of arm portions 60a, 60b, of the coiled spring 60 extend from the coiled spring main body 60c in an approximately straight line shape, i.e., in an upper and a lower direction in FIG. 5, come into contact with the first axle 41 and the second axle 42, and impel the first axle 41 and the second axle 42 toward the housing portion 20, i.e., toward a left hand side thereof in FIG. 5.

Following is a description of an operation of the container securing device 100, according to the description herein.

Housing and Securing a Beverage Container

Figure 6A:
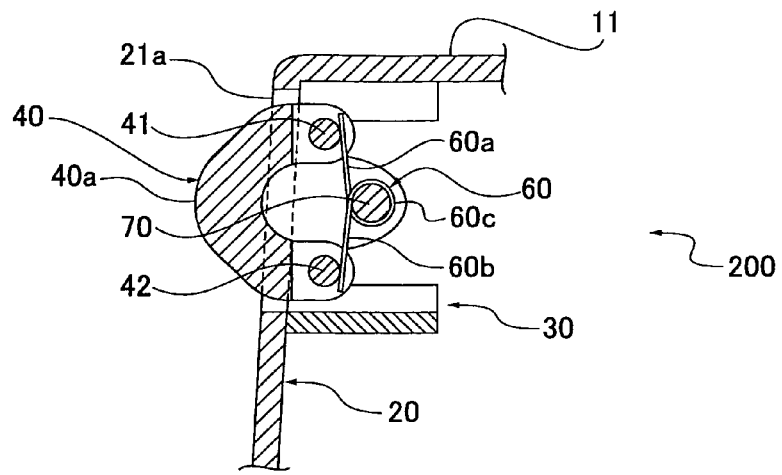
FIGS. 6A to 6C are cutaway views that describe an operation of the container securing device according to the embodiment.

When the beverage container 103 is not housed, the flap 40 is impelled (urged) by an impelling (urging) force of the coiled spring 60 into the interior of the housing portion 20, and the leading end 40a of the flap 40 protrudes into the interior space of the housing portion 20, such as is depicted in FIG. 6A.

Figure 6B:
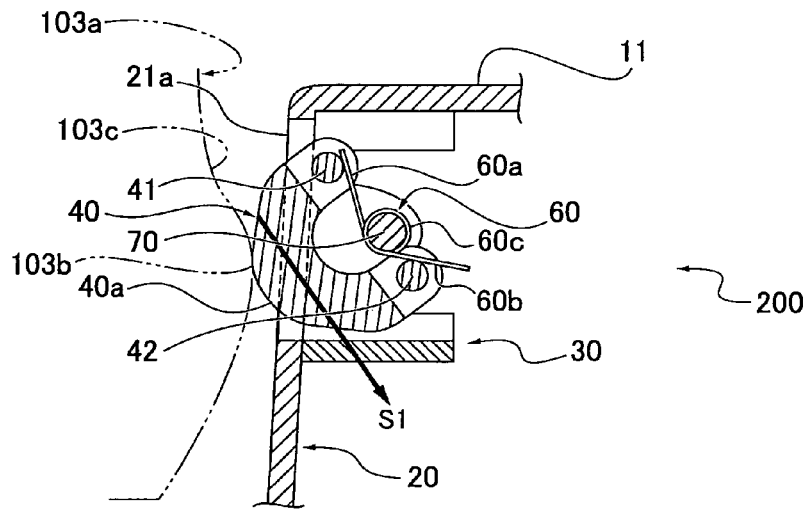
Figure 6C:
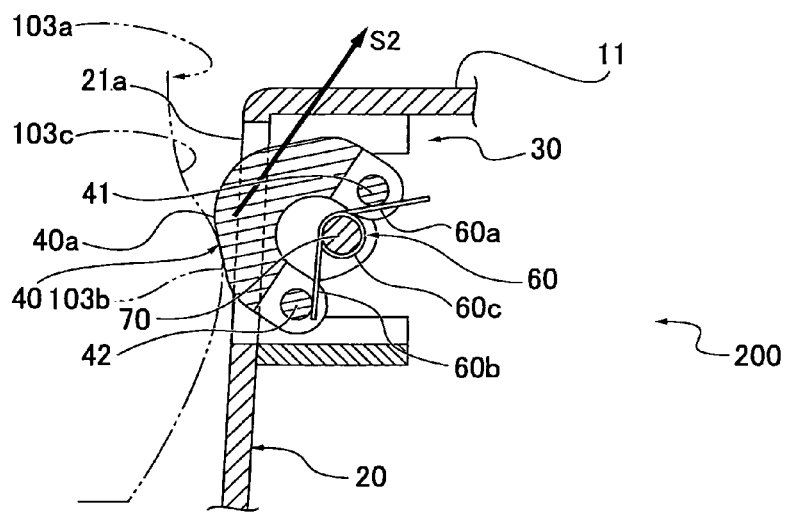

When the beverage container 103 is inserted via the upper opening 21b of the housing portion 20, the widening component 103b of a surface 103a of the beverage container 103 comes into contact with the leading end 40a of the flap 40, and applies force to the flap 40 in a direction that is denoted by an arrow S1, such as is depicted in FIG. 6B and FIG. 7A. As a consequence, the flap 40 swings, i.e., moves or rotates, in a counterclockwise direction revolving around the first axle 41, against the urging or moving force of the coiled spring 60, and is propelled into the hole 21a of the cylindrical wall 21d of the housing portion 20.

Given that the flap 40 is being constantly urged toward the center of the housing portion 20 by the coiled spring 60, further inserting the beverage container 103 into the housing portion 20 causes the leading end 40a of the flap 40 to make a rubbing contact upon the tapering constriction component 103c of the beverage container 103. In such a circumstance, the flap 40, being urged toward the center of the housing portion 20 by the coiled spring 60, swings, i.e., moves, in a clockwise direction revolving around the second axle 42, while also being propelled toward the interior of the housing portion 20 (refer to FIG. 7B). As a consequence thereof, the leading end 40a of the flap 40 comes into contact with the tapering constriction component 103c of the beverage container 103, without catching upon the widening component 103b of the beverage container 103, and it is possible to secure the beverage container 103 thereby. As a consequence thereof, it is possible to reliably fix the beverage container 103 within the housing portion 20.

Extraction of the Beverage Container

Lifting the beverage container 103 from the housing portion 20 when extracting the beverage container 103 causes the leading end 40a of the flap 40, which is in contact with the tapering constriction component 103c of the beverage container 103, to be urged in an upward direction S2, and to make a rubbing contact in the direction of the widening component 103b thereof. The rubbing contact thereof causes the flap 40 to swing, i.e., to move or rotate, in the counterclockwise direction revolving around the second axle 42, resisting the urging force of the coiled spring 60, and the leading end 40a of the flap 40 is thereby moved into the hole 21a of the housing portion 20.

Given that the flap 40 is being constantly urged toward the housing portion 20 by the coiled spring 60, further lifting the beverage container 103 causes the leading end 40a of the flap 40 to move beyond the widening component 103b of the beverage container 103, and to make a rubbing contact in the direction of a lower portion 103d thereof. In such a circumstance, the flap 40 swings in the counterclockwise direction revolving around the second axle 42, and is also propelled toward the interior of the housing portion 20, thereby returning to an initial state wherein the beverage container 103 is not housed.

In addition, it is possible for the flap 40 to move smoothly, because the center shoe portion 31Af, 31Bf is formed in the approximate semicircular arc shape, as is depicted in FIG. 4B.

Given that the flap 40 moves when the beverage container 103 is extracted, as is depicted in FIGS. 7A to 7C, it is possible to smoothly extract the beverage container 103, without the flap 40 catching upon the tapering constriction component 103c of the beverage container 103. As a consequence thereof, no risk exists that the flap 40 will be damaged thereby.

Given that the flap 40 moves in accordance with a shape of the tapering constriction component 103c of the beverage container 103 when the beverage container 103 is extracted in the manner described herein, it is possible to reliably secure the tapering constriction component 103c of the beverage container 103 without catching the flap 40 upon the widening component 103b of the beverage container 103, and to reliably fix the beverage container 103 within the housing Portion 20 thereby.

Given that a typical device that secures a beverage container is installed so as to be capable of swinging within the inner wall of the housing portion that houses the beverage container, or within a location that corresponds to the inner wall of the housing portion that houses the beverage container, the securing mechanism thereof is exposed in its entirety in many instances, and the swinging motion of the securing mechanism may be inhibited as a beverage fluid adheres to, and degrades a swinging hinge base portion of the securing mechanism. In addition, the fact that such a securing mechanism is typically exposed is not considered particularly suitable from a standpoint of vehicle compartment design. The present invention resolves such problems as in the foregoing, in addition to the problems described herein.

It is possible to extract a beverage container by way of the container securing device according to the present invention without causing the flap to catch upon a side surface widening component of the beverage container.

As an example thereof, given that the flap moves in accordance with a shape of the widening component of the beverage container when the beverage container is extracted, it is possible to smoothly extract the beverage container, without the flap catching upon the widening component of the beverage container.

Although the preferred embodiments of the present invention have been described herein, it should be understood that the present invention is not limited to the embodiments described herein, and that various modifications and changes can be made to the embodiments.

What is claimed is:

1. A container securing device, comprising:
a housing portion for housing a container, said housing portion having a cylindrical shape, a surrounding wall with a hole therein, and an opening at an upper end thereof;
a flap positioned within said hole of said surrounding wall of said housing portion, said flap being configured and arranged with respect to said housing portion such that a leading end portion of said flap is operable to move in or out of said housing portion in response to the container being inserted into the housing portion or being extracted from the housing portion; and
an urging component comprising a spring for pushing said flap toward an interior of said housing portion;
wherein said housing portion, said flap, and said urging component are interconnected and configured such that:
when the container is not housed within said housing portion, said flap is in a projected position in which said leading end portion of said flap protrudes into an interior of said housing portion;
said flap is operable to be rotated from said projected position in either a first direction or a second direction opposite said first direction;
when the container is being inserted into the housing portion, said flap is operable to rotate in said first direction from said projected position to an extracted position in which said flap is withdrawn from the interior of said housing portion by contacting an outer wall of the container; and
when the container is being removed from the housing portion, said flap is operable to rotate in said second direction from the projected position to the extracted position by contacting the outer wall of the container.

2. The container securing device of claim 1, wherein said leading end portion of said flap for contacting the container has an approximately semicircular shape.

3. The container securing device of claim 2, wherein said flap includes a first axle and a second axle spaced apart along a direction of insertion of the container into, and removal of the container from, said housing portion with an interval therebetween, said urging component being configured to urge said first axle and said second axle toward the interior of said housing portion, and said flap being configured to rotate around either of said first axle or said second axle.

4. The container securing device of claim 1, wherein said flap includes a first axle and a second axle spaced apart along a direction of insertion of the container into, and removal of the container from, said housing portion with an interval therebetween, said urging component being configured to urge said first axle and said second axle toward the interior of said housing portion, and said flap being configured to rotate around either of said first axle or said second axle.

5. The container securing device of claim 1, further comprising a guide portion for guiding movement of said flap between the projected position and the extracted position, said flap having a pair of axles for riding along said guide portion such that said flap is pivotable along either of said pair of axles.

6. A container securing device, comprising:
a housing portion for housing a container said housing portion having a cylindrical shape, a surrounding wall with a hole therein, and an opening at an upper end thereof;
a flap positioned within said hole of said surrounding wall of said housing portion, said flap being configured and arranged with respect to said housing portion such that a leading end portion of said flap is operable to move in or out of said housing portion in response to the container being inserted into the housing portion or being extracted from the housing portion;
an urging component for urging said flap toward an interior of said housing portion;
wherein said housing portion, said flap, and said urging component are interconnected and configured such that:
when the container is not housed within said housing portion, said flap is in a projected position in which said leading end portion of said flap protrudes into an interior of said housing portion;
said flap is operable to be rotated from said projected position in either a first direction or a second direction opposite said first direction;
when the container is being inserted into the housing portion said flap is operable to rotate in said first direction from said projected position to an extracted position in which said flap is withdrawn from the interior of said housing portion by contacting an outer wall of the container; and
when the container is being removed from the housing portion, said flap is operable to rotate in said second direction from the projected position to the extracted position by contacting the outer wall of the container; and
said container securing device further comprising a guide portion for guiding movement of said flap between the projected position and the extracted position, said flap having a pair of axles for riding along said guide portion such that said flap is pivotable along either of said pair of axles.

* * * * *